Figure 1:
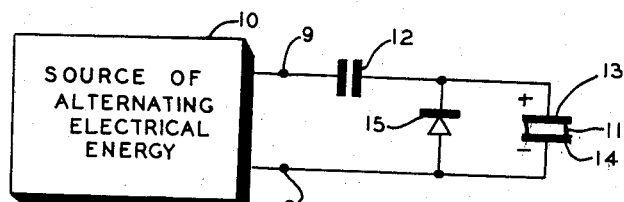

Jan. 8, 1963
S. R. RICH
3,072,805
AUTOPOLARIZATION OF ELECTROSTRICTIVE TRANSDUCERS
Filed Nov. 13, 1958
2 Sheets-Sheet 1

INVENTOR.
STANLEY R. RICH
BY
ATTORNEY

Jan. 8, 1963

S. R. RICH 3,072,805

AUTOPOLARIZATION OF ELECTROSTRICTIVE TRANSDUCERS

Filed Nov. 13, 1958

2 Sheets-Sheet 2

INVENTOR.
STANLEY R. RICH
BY
ATTORNEY

United States Patent Office 3,072,805
Patented Jan. 8, 1963

3,072,805
AUTOPOLARIZATION OF ELECTROSTRICTIVE TRANSDUCERS
Stanley R. Rich, West Hartford, Conn., assignor, by mesne assignments, to Acoustica Associates, Inc., Beverly Hills, Calif., a corporation of New York
Filed Nov. 13, 1958, Ser. No. 773,692
12 Claims. (Cl. 310—8.1)

This invention relates to electromechanical transducers of the electrostrictive variety, and more particularly to the autopolarization of ferroelectric and similar crystal structures such as perovskite, of which barium titanate is the most commonly used example.

The ferroelectric properties of perovskite crystal structures distinguish them from ordinary piezoelectric materials. Conditions favoring these properties exist in the titanates of some alkaline earth metals, and in certain columbates and tantalates. For example, in crystals of barium titanate, the titanium atom, because of its small size relative to the surrounding ions, is easily displaced by an electric field. In the tetragonal phase, the titanium atom tends to move toward one of the face-centered oxygen atoms, owing to the potential distribution between two opposite oxygen atoms. As a result, each crystal cell has a dipole moment which may be oriented toward any one of the six oxygen atoms. Regions of parallel alignment, made up of neighboring cells whose orientations mutually influence each other, are called "Domains." They are similar to the domains of elemental magnets in ferromagnetic materials, except that they are due to an electric field.

In the tetragonal phase of barium titanate crystals, the axis in the direction of titanium displacement is longer (by 1 percent) than the other two axes. If a strong electric field is applied to a body of this material, the electric axes of the domains oriented at angles other than parallel to the field tend to turn into the direction of the field, and the body tends to elongate in the direction of the field. If the field is reversed through 180 degrees, the body will contract in the direction of the field and then elongate again. An alternating field will thus cause the crystal body to vibrate in length or thickness at twice the field frequency. If a unidirectional electric field is simultaneously imposed, the vibration frequency will be the same as the alternating field frequency. The unidirectional field acts similarly to the D.C. polarizing current in a magnetostrictive transducer.

More significant is the fact that the alternating field required to cause thickness vibration in the presence of a unidirectional field is much smaller than the alternating field required to cause thickness vibration of similar amplitude without the unidirectional field. If a strong unidirectional electric field (called a "D.C. Bias") is once applied to a barium titanate crystal body, some of the induced domain alignment persists after the biasing field is removed. This remanent field provides an internal field; it is called "prepolarization."

Barium titanate is commonly used in a ceramic form, in which many small crystallites are baked together and each crystallite is subdivided into electric domains. A dense ceramic is made by pressing and baking, which locks the individual crystallites into position that are randomly oriented with respect to their "longer" axes. Because of this interlocking, elastic forces must be overcome to align the domains with the polarizing field. Thermal vibrations within the ceramic assist an external D.C. bias in this respect, as does the application of external heat.

A driving voltage applied to a polarized barium titanate disc at a voltage frequency near the resonance frequency of the disc will make the domains oriented parallel or nearly parallel to the field direction "grow" in that direction at the expense of neighboring domains oriented at angles to the field direction. Hence, the disc becomes thicker when the driving field is parallel to the polarizing field, and thinner when the driving field is antiparallel to the polarizing field. The driving field and the resulting mechanical displacement are not completely in phase. There is a hysteresis loop with accompanying losses. The loss tangent of barium titanate is of the order of 2 percent, which is about 100 times larger than for quartz. If such transducers are driven too hard, excessive heat will be generated within the ceramic. This may raise the temperature up to the Curie point, which is 120 degrees centigrade for barium titanate. Above this temperature, barium titanate changes from tetragonal to cubic structure, resulting in completely depolarizing a prepolarized material.

When it was first found that barium titanate in ceramic form exhibited electromechanical response, the observations were made under maintained electric bias. Subsequently, it was recognized that a large portion of this response was retained after the removal of the electric bias voltage, and it became standard practice to operate such transducers on the basis of remanent polarization. Later it has been found that under large alternating fields as applied in some ultrasonic treatment and other high power applications, remanent polarization may be reduced or virtually lost, correspondingly decreasing or losing the electromechanical activity. The causes of this are depolarization as the opposing peak charge density becomes an appreciable fraction of the originally remanent polarization, and the temperature increase of the ceramic material caused by hysteresis losses in it. The same problem occurs when it is sought to employ such transducers in processes carried out at elevated temperatures approaching the Curie point.

According to my present invention, a unidirectional bias field for prepolarized electrostrictive electromechanical transducers is automatically derived from the applied alternating driving voltage, and this field is applied in a sense to retain the initial remanent polarization of the transducer substantially without diminution. The transducer itself is employed as an electrical circuit element in the bias circuit, in addition to its function as a transducer. It is a feature of the invention that the bias field may have a value closely approximating the negative peak value of the maximum applied alternating driving voltage, thereby assuring operation about the remanence point and minimizing hysteresis losses in the transducer.

Figure 3:
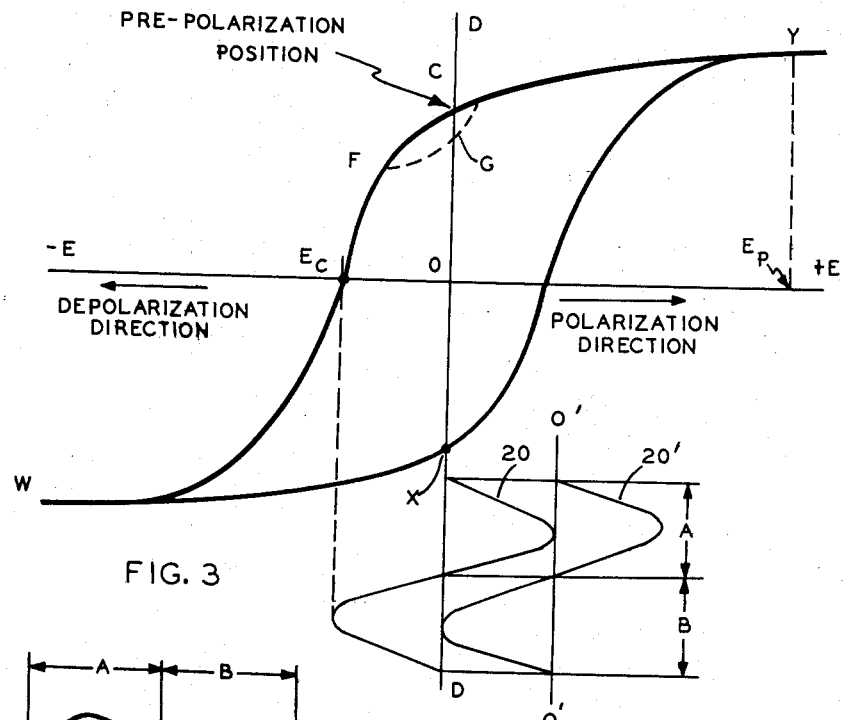
Figure 2:
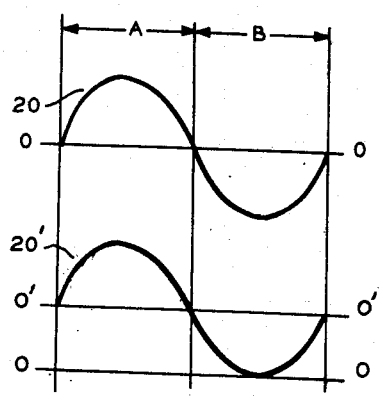
Figure 4:
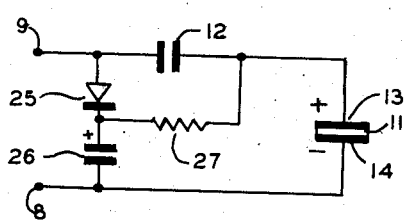
Figure 5:
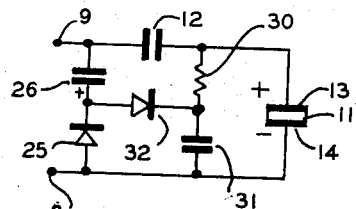
Figure 7:
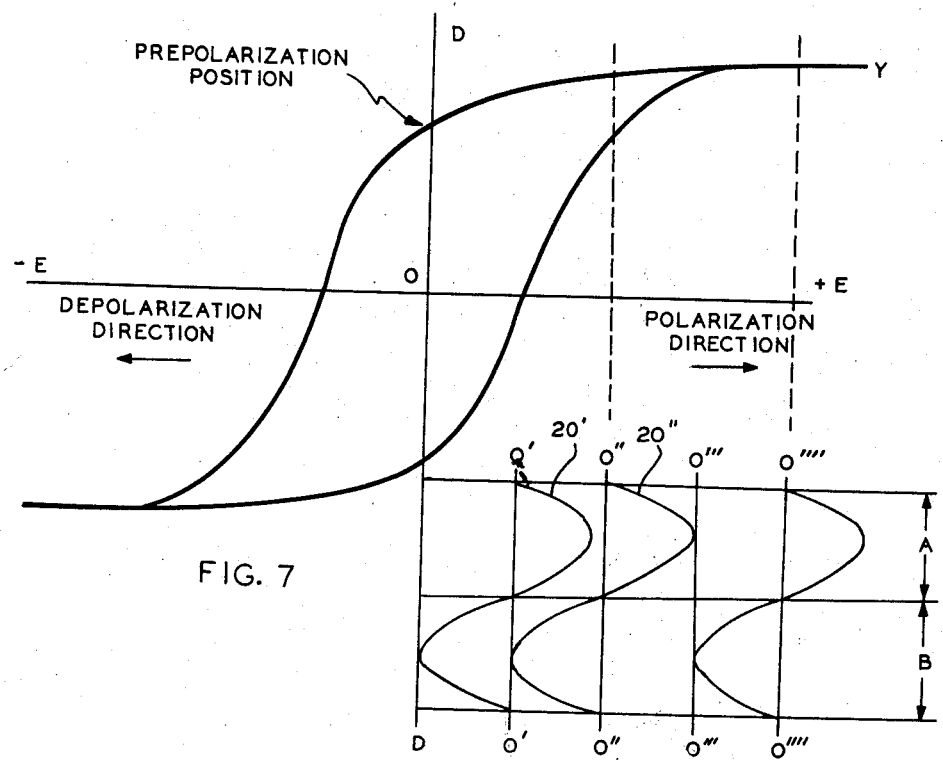
Figure 6:
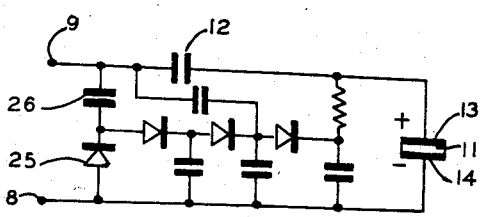

It is among the objects of my invention to provide a simple bias voltage circuit having the foregoing advantages, and others including the advantage of maintaining transducer losses relatively low and independent of the applied alternating driving field. Other and further advantages of the invention will become apparent from the following description of an embodiment thereof. This description refers to the accompanying drawing, wherein:

FIG. 1 is a schematic diagram of an embodiment of the invention;
FIG. 2 is a set of curves illustrating the operation of FIG. 1;
FIG. 3 is a diagram further illustrating the operation of FIG. 1;
FIGS. 4, 5 and 6 are schematic diagrams of additional embodiments of the invention; and
FIG. 7 is a diagram further illustrating the operation of the various embodiments.

Referring to FIG. 1, a source of alternating electric energy 10 is connected to an electrostrictive electromechanical transducer 11 via a coupling capacitor 12 and terminals 8 and 9. The source of energy 10 may be of any desired form, such as an electronic oscillator and power amplifier, or a rotating machine adapted to provide electric energy at the required frequency. Its output may have any desired wave form, including but not necessarily limited to a sinusoidal wave form. The transducer 11 may, for example, be made of barium titanate. This may be in disc form, and has electrically-conductive material on its opposing surfaces; this material is shown greatly enlarged in FIG. 1 as flat plates 13 and 14. The transducer is prepolarized in the sense corresponding to a positive charge applied to the upper plate 13 and a negative charge applied to the lower plate 14. A rectifier 15 is connected across the transducer 11, poled to maintain the upper plate 13 positively charged with respect to the lower plate 14.

Referring to FIG. 2, curve 20 illustrates a sinusoidal wave form, which may for the purposes of describing the operation of FIG. 1, be regarded as representative of the output voltage wave form of the energy source 10 in FIG. 1. One complete sinusoidal cycle is shown, comprising a positive-going half-cycle in the time period A and a negative-going half-cycle in the time period B. This curve 20 is centered at a median level represented by line 0—0, which may be taken as the zero-voltage reference.

During period A, the upper plate 13 (FIG. 1) is charged positive relative to the lower plate 14. The coupling capacitor 12 is very large compared with the capacitance of the transducer 11 (with plates 13 and 14), so that substantially the full peak voltage of the source 10 is applied across the capacitance of the transducer 11. Rectifier 15 is chosen to have a high back resistance, so that at the end of time period A, a charge having a voltage value approaching the peak value of the positive-going half-cycle of the source output voltage 20 remains across the transducer 11, the upper plate 13 being charged positive relative to the lower plate 14. During time period B, the source voltage 20 is applied across the transducer 11 in the opposite direction, and would, in the absence of the rectifier 15, tend to charge the lower plate 14 positive relative to the upper plate 13. However the rectifier 15 is poled to present its lower resistance to the flow of current between the plates 13 and 14 when the lower plate 14 is positive relative to the upper plate 13, so that charge applied across the transducer 11 during the negative-going half-cycle B leaks off through the rectifier 15, instead of accumulating in the capacitance of the transducer. As a result, within one, or at most, very few cycles of the source output voltage, the transducer 11 becomes charged to the peak voltage of the source 10, with the upper plate 13 positive relative to the lower plate 14.

The effect of the foregoing action is that the impressed voltage 20′ (FIG. 2) appearing across the transducer 11 is centered at a median voltage level 0′—0′ which is equal to the voltage of the charge on the transducer. Since this charge is equal in magnitude to the peak voltage of a half-cycle of the source output voltage 20, this new median level 0′—0′ is at an equal positive voltage relative to the source reference voltage level 0—0. As a result, the impressed voltage 20′ can never drop below the source reference voltage 0—0, even at the instant of the negative-going peak during time period B; the impressed voltage 20′ across the transducer 11 will barely reach the source reference voltage 0—0 at that instant, as is shown in the lower half of FIG. 2.

Referring to FIG. 3, curves W—X—Y and Y—C—W illustrate a typical hysteresis loop of barium titanate (or other perovskite) crystal. The horizontal line, (—)E to 0 to (+)E, represents magnitudes of applied electric force, in volts, in the (—) and (+) directions relative to the zero-voltage level "0." The vertical line D—D represents, in either direction from the intersection "0" with horizontal line, increasing magnitudes of the polarization of the crystal. Assuming that the transducer 11 was prepolarized by applying a voltage $E_p$ across the plates 13 and 14, with the upper plate 13 positive relative to the lower plate 14, the direction of (+)E is the polarization direction, and the direction of (—)E is the depolarization direction relative to the transducer when so polarized. After the polarization voltage $E_p$ was removed, the transducer 11 assumed the prepolarization position C, with "0" voltage across it. $E_c$ represents the coercive force of the transducer 11 in this condition. If a negative voltage (—)E of a magnitude greater than $E_c$, or even approaching the magnitude of $E_c$ in the presence of heat, were to be applied across the transducer, it would tend quickly to depolarize the transducer.

Applying the voltage curves of FIG. 2 to FIG. 3, we see that the source voltage 20 alternates about the "0" voltage level, going toward (+)E in time period A and toward (—)E in time period B. Without the rectifier 15, this voltage, when applied across the transducer 11, would, in time period B, approach in value a voltage equal to the coercive force $E_c$. If it approached too closely, or reached $E_c$, the transducer 11 would tend to depolarize, and, if the source voltage were large enough, the transducer would be depolarized. Even when the source voltage 20 is not large enough to depolarize the transducer 11, during the negative-going time period B it constitutes a voltage in the depolarization direction, so that it moves the polarization out of the relatively linear region C—Y, to a position indicated at F. Then, during the succeeding time period A, the polarization is returned along the dotted line G to a position on the line between C and Y, due to hysteresis in the crystal material. This means that heat will be generated in the crystal, which in turn has the two disadvantageous effects of losing energy in the form of heat, and heating the transducer 11 so that a negative-going source voltage 20 approaching the voltage level $E_c$ will more easily depolarize the crystal material.

The numerous advantages of my invention are now readily apparent. As was made clear with reference to FIG. 2, the presence of the rectifier 15 in the circuit of FIG. 1 has the effect of maintaining the voltage 20′ impressed across the transducer always above the "0" voltage level, in the positive going direction; that is, always in the polarization direction, (+)E. The polarization of the transducer 11 is altered during operation at levels always above the prepolarization position C, where the hysteresis loop is relatively more linear. When operated in this manner, the crystal material of the transducer has smaller hysteresis loss, and hence smaller internal heat. No driving voltage is ever applied in the depolarization direction, so that regardless of the magnitude of the applied voltage (short of an applied voltage which would break down the crystal material as a dielectric) there will be neither danger of depolarization nor of overheating. Furthermore, this feature is automatically provided, without any external bias source or control equipment.

As is known, with practical barium titanate transducers under continuous wave operation, depolarization can be expected to occur when an elastic wave power level (or sound intensity) larger than 3 watts per square centimeter is attempted to be generated, unless the transducer is maintained by auxiliary means at a temperature below the Curie point. With my invention, it is possible to radiate elastic wave energy at intensities up to 10 watts per square centimeter continuously, even if the crystal temperature reaches the Curie point.

The requirements for the components of FIG. 1 are quite simple. The coupling capacitor is chosen to have capacitance large relative to that of the transducer 11 in order to avoid dividing the source voltage between these two components, and to provide that substantially all of the source voltage appears across the transducer. The rectifier 15 is chosen to have a high back resistance, so that leakage of polarization-aiding charge from the transducer 11 will be minimized; this will have the desired effect of moving the curve 20′, representing applied signal voltage across the transducer 11, so that it is substantially always in the polarization direction (+)E, as shown in FIG. 3. The transducer 11 itself is an excellent capacitor, with practically negligible D.C. leakage. The leakage of charge from the transducer is of the order of 10 microamperes, and the rectifier 15 has the function of replacing the charge lost through this leakage. The rectifier is poled so that, if it is a perfect rectifier, a D.C. voltage will be developed and applied to the transducer 11 in such a sense and of such a magnitude that there will be substantially no signal applied at any time in the depolarization direction. The rectifier should desirably be chosen to be as nearly perfect as is available.

In FIGS. 4, 5 and 6 the source of alternating electric energy which will be connected to the terminals 8 and 9 is not shown; it may be the source 10 of FIG. 1 in each case. Elements of the embodiment shown in these figures which are the same as elements in FIG. 1 have like reference characters.

In FIG. 4, a rectifier 25 and a capacitor 26 are connected in series across the terminals 8 and 9. A resistor 27 is connected from the junction of the rectifier 25 and capacitor 26 to the upper (in FIG. 4) electrode 13 of the transducer 11. The rectifier is poled to maintain the upper (in FIG. 4) terminal of this capacitor positively charged with respect to the lower terminal. The rectifier 25 has properties similar to those of the rectifier 15 of FIG. 1, so that the positive charge which is accumulated on the upper terminal of the capacitor 26 is practically at the same potential as the zero-to-peak or crest voltage of the source (not shown) during the positive-going half-cycle, that is, during time period A as described above with reference to FIG. 1. This charge is applied through the resistor 27 across the transducer 11. The embodiment of FIG. 4, therefore, like the embodiment of FIG. 1 applies and maintains a charge across the transducer, derived from the driving source, which has a magnitude substantially equal to the crest voltage of a chosen half-cycle of the driving source alternating voltage.

In FIG. 5, the rectifier 25 and the capacitor 26 are connected across the terminals 8 and 9 in the reverse direction relative to FIG. 4, so that the lower terminal (in FIG. 5) of the capacitor has a positive charge applied to it during the time period (B) when terminal 8 is positive relative to terminal 9. A resistor 30 an a second capacitor 31 are connected in series across the transducer, the capacitor end of this series branch being connected to terminal 8. A second rectifier 32 is connected from the junction of the first capacitor 26 and rectifier 25 to the junction of the second capacitor 31 and the resistor 30, poled to have its lower resistance during the time period (A) when terminal 9 is positive relative to terminal 8. During time period A the second rectifier 32 charges the upper terminal (in FIG. 5) of the second capacitor 31 positively relative to the lower plate, to a voltage level substantially equal to the crest voltage of the source (not shown) plus the voltage of the charge placed across the first voltage capacitor 26. This occurs because the source voltage and the voltage of the charge in the first capacitor 26 are in series aiding across the second capacitor 31 during time period A. In one, or at most a few, cycles after initiation of source voltage the first capacitor 26 will be charged substantially to the source crest voltage during time period B, with the result that the second capacitor 31 becomes charged to a voltage equal substantially to the sum of the crest voltages in both time periods A and B, or equal to the peak-to-peak voltage of the source voltage. The circuit of FIG. 5 is thus a form of voltage doubler, and will be recognized as a standard "voltage doubler" rectifier circuit.

The voltage across the second capacitor 31 is applied across the transducer through the resistor 30, as a bias voltage substantially twice the crest voltage of a sinusoidal voltage source. Referring to FIG. 7, which is similar to FIG. 3, curve 20″, centered on line 0″—0″ which is shown extended by a dotted line into the portion C—Y of the hysteresis loop, we fine that this circuit operates the transducer still further in the polarization direction, that is, with a bias, derived from the signal source, which is even closer to the prepolarization voltage $E_p$. Operation is moved further into the relatively linear portion of the curve C—Y, with an increase in the beneficial results mentioned above, especially that of reduced internal heating of the transducer, and that of providing the opportunity to operate the transducer at higher signal voltage levels.

FIG. 6 shows a rectifier voltage quadrupler circuit connected to the terminals 8 and 9, by means of which a voltage of a magnitude equal substantially to four times that of the signal source (not shown) is derived from the signal and applied as a self-bias polarization voltage across the transducer 11. It is not necessary to describe this voltage quadrupler circuit in detail, since it is a known circuit, which has been published in Handbook No. 667 of the Sarkes-Tarzian Company, Rectifier Division, 415 North College Avenue, Bloomington, Indiana. In this handbook, rectifier voltage multiplier circuits substantially the same as those illustrated in the accompanying drawings are shown in pages 25 and 26.

With the circuit of FIG. 6, the transducer is self-biased by the driving signal to be operated about the reference voltage level represented by line 0″″—0″″ in FIG. 7. The desirable features of the invention are still further enhanced when the transducer is operated with a self-bias which is so much greater in the polarization direction.

It will be understood that many forms of rectifier voltage multiplier circuits are well known in the art and in fact the above mentioned Sarkes-Tarzian Handbook shows, in pages 25 and 26, a rectifier voltage doubler circuit and a rectifier voltage tripler circuit. Further, since no current is drawn by the transducer 11, which is simply polarized as a capacitor is polarized, further voltage multiplication is possible without loss of efficiency of voltage multiplication. Actually it is possible not only to quadruple, but to multiply further as desired, and in the claims that follow the term "voltage multiplier" is intended to encompass rectifier voltage doubling, tripling, quadrupling circuits and all rectifier voltage multiplier circuits capable of higher orders of voltage multiplication as sources of self-polarization bias.

This completes my description of certain embodiments of my invention and of some of its advantages. Other embodiments of my invention may occur to those skilled in the art. Except as they may be so limited in their own terms, the claims which follow are not intended to be limited by the details of the embodiments herein described and illustrated.

What I claim is:

1. Autopolarization circuit for a prepolarized electrostrictive electromechanical transducer having an inherent self-capacitance comprising, said transducer, a source of alternating electric driving energy coupled thereto by a capacitor, and substantially unidirectional rectifier means connected across said transducer poled to have its higher resistance during flow of driving energy in the direction tending to charge said transducer in the sense which aids the prepolarization thereof, whereby said circuit passes to said transducer substantially the entire alternating driving energy and simultaneously said rectifier means causes charging of said self-capacitance with a unidirectional bias voltage derived from said source and proportional in amplitude to the peak amplitude of the alternating driving voltage.

2. Autopolarization circuit for a prepolarized electrostrictive electromechanical transducer having an inherent self-capacitance comprising, said transducer, a source of alternating electric driving energy coupled thereto by a capacitor having capacitance large compared to that of said transducer, and substantially unidirectional rectifier means connected across said transducer poled to have its higher resistance during flow of driving energy in the direction tending to charge said transducer in the sense which aids the prepolarization thereof, whereby said circuit passes to said transducer substantially the entire alternating driving energy and simultaneously said rectifier means causes charging of said self-capacitance with a unidirectional bias voltage derived from said source and proportional in amplitude to the peak amplitude of the alternating driving voltage.

3. Autopolarization circuit for an electromechanical transducer having an inherent self-capacitance and made of a body of prepolarized electrostrictive dielectric material and electrically conductive contacts on opposite sides thereof comprising, said transducer, a source of alternating electric driving energy coupled to said contacts by a capacitor having capacitance large compared to that of said transducer, and substantially unidirectional a rectifier connected directly across said contacts poled to have its higher resistance during flow of driving energy in the direction tending to charge said transducer in the sense which aids the prepolarization of said dielectric material, whereby said circuit passes to said transducer substantially the entire alternating driving energy and simultaneously said rectifier means causes charging of said self-capacitance with a unidirectional bias voltage derived from said source and proportional in amplitude to the peak amplitude of the alternating driving voltage.

4. Autopolarization circuit for an electromechanical transducer having an inherent self-capacitance and made of a body of prepolarized electrostrictive dielectric material and electrically conductive contacts on opposite sides thereof comprising, said transducer, a source of alternating electric driving energy capacitively coupled to said contacts, and substantially unidirectional a rectifier connected directly across said contacts poled to accumulate charge on said contacts in the same direction as the prepolarization of said dielectric material, said rectifier having back resistance sufficiently high to assure that the polarization of said transducer is maintained at or above the remanence position throughout operation by said driving energy.

5. Autopolarization circuit for a prepolarized electrostrictive electromechanical transducer having an inherent self capacitance, said circuit comprising said transducer, a source of alternating electric driving energy coupled thereto via a first capacitor to two electrical contacts distributed over two opposing surfaces thereof and forming therewith a second capacitor and substantially unidirectional conductor means connected in parallel circuit with said transducer to accumulate force from said driving energy in said transducer in the sense which aids the prepolarization of said transducer.

6. Autopolarization circuit for a prepolarized electrostrictive electromechanical transducer having an inherent self-capacitance, said circuit comprising said transducer, a source of alternating electric driving energy coupled thereto via a first capacitor to two electrical contacts distributed over two opposing surfaces thereof and forming therewith a second capacitor, and substantially unidirectional conductor means connected in parallel circuit with said transducer to accumulate force from said driving energy in said transducer in the sense which aids the prepolarization of said transducer, said first capacitor having a capacitance so large with respect to the capacitance of said transducer that substantially the entire peak voltage of said source is applied across said transducer.

7. Autopolarization circuit for a prepolarized electrostrictive electromechanical transducer having an inherent self-capacitance comprising, said transducer, a source of alternating electric driving energy coupled through a capacitor to two electrical contacts distributed over two opposing surfaces thereof, and substantially unidirectional conductor means in circuit with said transducer to accumulate a charge from said source on said contacts in the sense tending to aid the prepolarization of said transducer, said means including a rectifier in parallel to said transducer and poled to have its higher resistance during flow of driving energy in the direction tending to charge said transducer in said sense, said rectifier having sufficiently high back resistance substantially to assure operation of said transducer at polarization levels at or above the remanence position throughout a cycle of said driving energy.

8. Autopolarization circuit for a prepolarized electrostrictive electromechanical transducer having an inherent self-capacitance comprising, said transducer, a source of alternating electric driving energy coupled through a capacitor to two electrical contacts distributed over two opposing surfaces thereof, and substantially unidirectional conductor means in circuit with said transducer to accumulate a charge from said source on said contacts in the sense tending to aid the prepolarization of said transducer, said means including a rectifier in parallel to said transducer and poled to have its higher resistance during flow of driving energy in the direction tending to charge said transducer in said sense, said rectifier having sufficiently high back resistance substantially to assure operation of said transducer at polarization levels at or above the remanence position throughout a cycle of said driving energy, said capacitor having capacitance sufficiently greater than that of said transducer to assure that substantially the full peak voltage of said source is applied across said transducer.

9. Autopolarization circuit for prepolarized electrostrictive electromechanical transducer having an inherent self-capacitance comprising, said transducer, a source of alternating electric driving energy coupled thereto by a capacitor, and substantially unidirectional rectifier voltage multiplier circuit means connected at its input to said source and at its output across said transducer in the sense which aids the prepolarization thereof, whereby said circuit passes to said transducer substantially the entire alternating driving energy and simultaneously said rectifier means causes charging of said self-capacitance with a unidirectional bias voltage derived from said source and portional in amplitude to the peak amplitude of the alternating driving voltage.

10. Autopolarization circuit for a prepolarized electrostrictive electromechanical transducer having an inherent self-capacitance comprising, said transducer, a source of alternating electric driving energy coupled thereto by a capacitor, substantially unidirectional rectifier means and a second capacitor connected in series with one another and in parallel across said source and said transducer, and circuit means connecting said second capacitor to said transducer in a manner to apply the charge of said capacitor across said transducer in the sense which aids the prepolarization thereof, whereby said circuit passes to said transducer substantially the entire alternating driving energy and simultaneously said rectifier means causes charging of said self-capacitance with a unidirectional bias voltage derived from said source and proportional in amplitude to the peak amplitude of the alternating driving voltage.

11. Autopolarization circuit for a prepolarized electrostrictive electromechanical transducer having an inherent self-capacitance comprising, said transducer, a source of alternating electric driving energy coupled thereto by a capacitor, first substantially unidirectional rectifier means and a second capacitor connected in series with one another and in parallel across said source and said transducer, second substantially unidirectional rectifier means and a third capacitor connected therewith in a voltage multiplier circuit, and circuit means connecting the output of said voltage multiplier circuit to said transducer in the sense which aids the prepolarization thereof, whereby said circuit passes to said transducer substantially the entire alternating driving energy and simultaneously said rectifier means causes charging of said self-capacitance with a unidirectional bias voltage derived from said source and proportional in amplitude to the peak amplitude of the alternating driving voltage.

12. Autopolarization circuit for an electromechanical transducer having an inherent self-capacitance and made of a body of prepolarized electrostrictive dielectric material and electrically conductive contacts on opposite sides thereof comprising, said transducer, a source of alternating electric driving energy coupled to said contacts by a capacitor having capacitance large compared to that of said transducer substantially unidirectional, rectifier voltage multiplier circuit means connected at its input to said source and at its output in parallel to said contacts in the sense which aids the prepolarization of said dielectrical material, whereby said circuit passes to said transducer substantially the entire alternating driving energy and simultaneously said rectifier means causes charging of said self-capacitance with a unidirectional bias voltage derived from said source and proportional in amplitude to the peak amplitude of the alternating driving voltage.

References Cited in the file of this patent

UNITED STATES PATENTS

| | | |
|---|---|---|
| 1,928,503 | Reisz | Sept. 26, 1933 |
| 2,358,391 | Ford | Sept. 19, 1944 |
| 2,540,841 | Stancu | Feb. 6, 1951 |
| 2,592,703 | Jaffee | Apr. 15, 1952 |
| 2,600,172 | St. John | June 10, 1952 |
| 2,624,853 | Page | Jan. 6, 1953 |
| 2,659,829 | Baerwald | Nov. 17, 1953 |
| 2,678,373 | Suran | May 11, 1954 |
| 2,794,921 | Hermes | June 4, 1957 |
| 2,819,442 | Goodrich | Jan. 7, 1958 |

FOREIGN PATENTS

| | | |
|---|---|---|
| 1,091,147 | France | Oct. 27, 1954 |